US008387016B2

(12) United States Patent
Tillmann et al.

(10) Patent No.: US 8,387,016 B2
(45) Date of Patent: Feb. 26, 2013

(54) WHITEBOX TRACE FUZZING

(75) Inventors: Nikolai Tillmann, Redmond, WA (US); Jonathan Paul de Halleux, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 12/434,558

(22) Filed: May 1, 2009

(65) Prior Publication Data
US 2010/0281460 A1  Nov. 4, 2010

(51) Int. Cl.
G06F 9/44  (2006.01)
G06F 9/45  (2006.01)

(52) U.S. Cl. .................. 717/124; 717/148; 717/125

(58) Field of Classification Search .......... 717/106, 717/124–134
See application file for complete search history.

(56) References Cited

U.S. PATENT DOCUMENTS

| 6,112,312 | A  | * | 8/2000  | Parker et al. ............ 714/32   |
|-----------|----|---|---------|------------------------------------|
| 6,957,420 | B2 |   | 10/2005 | Hand, Jr. et al.                   |
| 7,349,837 | B2 | * | 3/2008  | Martin et al. ............ 703/22   |
| 7,496,791 | B2 |   | 2/2009  | Tillmann et al.                    |
| 7,788,647 | B2 | * | 8/2010  | Martin et al. ............ 717/135  |
| 7,890,808 | B2 | * | 2/2011  | Branca et al. ............ 717/124  |
| 7,941,792 | B2 | * | 5/2011  | Tromey ............ 717/148         |
| 7,950,004 | B2 | * | 5/2011  | Vieira et al. ............ 717/125  |
| 8,103,913 | B2 | * | 1/2012  | Zambrana ............ 714/38.1      |
| 8,117,591 | B1 | * | 2/2012  | Michelsen ............ 717/109      |
| 8,161,459 | B2 | * | 4/2012  | Gorthi et al. ............ 717/124  |
| 2003/0212924 | A1 |  | 11/2003 | Avvari et al.                      |
| 2005/0160404 | A1 |  | 7/2005  | Nachmanson et al.                  |
| 2008/0172652 | A1 |  | 7/2008  | Davia et al.                       |
| 2008/0307264 | A1 |  | 12/2008 | de Halleux et al.                  |

OTHER PUBLICATIONS

Csallner, et al., "DySy: Dynamic Symbolic Execution for Invariant Inference", retrieved on Mar. 13, 2009 at <<http://research.microsoft.com/pubs/70511/tr-2007-151.pdf, 10 pages.
Ganesh, et al., "Taint-based Directed Whitebox Fuzzing", retrieved on Mar. 13, 2009 at <<http://people.csail.mit.edu/vganesh/Publications_files/vg2009-BuzzFuzz-ICSE.pdf>>, MIT Computer Science and Artificial Intelligence Lab, pp. 1-11.
Godefroid, et al., "Automatic Whitebox Fuzz Testing", retrieved on Mar. 13, 2009 at <<ftp://ftp.research.microsoft.com/pub/tr/TR-2007-58.pdf>>, Microsoft Corporation, pp. 1-13.
Lucio, et al., "Technology of Test-Case Generation", retrieved on Mar. 13, 2009 at <<http://www.springerlink.com/content/2ym612rmbadb291n/>>, Model-Based Testing of Reactive Systems, LNCS 3472, pp. 323-354, 2005.
"POCMock: the ultimate tool for creating Mock classes", retrieved on Mar. 13, 2009 at <<http://en.www.prettyobjects.com/POCMock.aspx>>, 2009 pretty OBJECTS, 1 page.

(Continued)

*Primary Examiner* — Don Wong
*Assistant Examiner* — Mohammad Kabir
(74) *Attorney, Agent, or Firm* — Lee & Hayes, PLLC

(57) ABSTRACT

Disclosed is a process to generate and execute relevant, non-redundant test cases starting with an execution trace. An execution trace may be collected. A sequence of actions and the data involved in the actions may then be extracted from the execution trace and persisted separately from one another. Code for a non-deterministic program ("NDP") may be generated, comprising the sequence of actions but without determining the data. A systematic program analysis of the NDP may be made, exploring possible execution paths and beginning from the path exercised by the persisted data. A new test case may be generated which fixes particular test inputs for the NDP.

20 Claims, 3 Drawing Sheets

OTHER PUBLICATIONS

"Rhino Mocks 3.5 RTM", retrieved on Mar. 13, 2009 at http://ayende.com/default.aspx>>, Ayende@ Rahien, Apr. 10, 2008, 2 pages.

Saff, et al., "Automatic Test Factoring for Java", retrieved on Mar. 13, 2009 at <<http://www.cs.washington.edu/homes/mernst/pubs/test-factoring-ase2005.pdf>>, ASE 2005, Nov. 7-11, 2005, Long Beach, CA., 10 pages.

Tillmann, et al., "Pex-White Box Test Generation for .NET", retrieved on Mar. 13, 2009 at http://www.springerlink.com/content/5q367v5652277x47/fulltext.pdf?page=1>>, TAP 2008, LNCS 4966, 1 page.

* cited by examiner

WHITEBOX TRACE FUZZING

BACKGROUND

Best practices in the development of quality software call for testing code under development at many points. Manual software testing is very expensive in terms of time, money, and other resources, and may not exercise the code sufficiently. Tools have been developed to mitigate these costs by generating test cases automatically. A test case is a set of inputs such as conditions or variables under which a tester will determine whether the code under development meets specifications.

Existing approaches have at least three major drawbacks: First, they are not fully automated, requiring continuing manual intervention. Second, they produce insufficiently relevant test cases, resulting in tests which serve no useful purpose. Third, they produce too many redundant test cases.

A relevant test case exercises a scenario similar to the scenarios which a user of the code is likely to exercise. A redundant test case exercises the same execution path, i.e., the same sequence of statements, as another test case. A collection of test cases is referred to as a "test suite." Adequate testing calls for a test suite of relevant and non-redundant test cases. Currently available tools still require manual intervention, test useless test cases, and test the same execution paths, resulting in wasted time, money, and other resources.

There is a need for automated software testing which is capable of providing, with minimal human intervention, a test suite comprised of relevant test cases which are non-redundant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed is a process to generate and execute relevant, non-redundant test cases starting with an execution trace. This execution trace may be acquired in several ways, including, for example, by recording details about a typical program execution and the data involved in that program execution. The program execution may be the result of a user manually testing the system, or may be from an existing (albeit possibly small or "starter") test suite.

A sequence of actions as well as the data associated with those actions is extracted from the execution trace. Code is generated for a non-deterministic program ("NDP") that includes the observed sequence of actions, but without determining the data. As used in this application, "non-deterministic" indicates that one or more different program execution paths are possible, without any specification as to which one will be taken during execution. Observed data is persisted (or stored) for later use. The data can be of simple types, e.g., integers, but the data can also be of more complex types, e.g., sets or maps or values, or graph structures, as long as the data can be persisted in a machine-readable format, and reconstructed from this format later.

A systematic program analysis ("SPA") of the NDP, including an analysis of the actions the NDP invokes may be made. The SPA explores possible execution paths of the NDP, starting with the path exercised by the previously observed data which was persisted.

This exploration of execution paths illustrates the "whitebox" nature of this process. In "whitebox" testing, code under test is exposed to a testing system. In contrast, with "blackbox" testing, the testing system is unaware of the code under test. When well-formed test data serving as input for a designated test action is slightly mutated (or changed), either in a random or systematic fashion in order to exercise different program behaviors, this is known as "fuzzing."

For each execution path, a new test case may be generated which fixes particular test inputs for the NDP. The process may then be iterated, to provide more comprehensive testing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As described above, current automated software testing tools suffer several serious drawbacks. These drawbacks include requiring continuing manual intervention to generate test cases, insufficiently relevant test cases, and production of too many redundant test cases. As described above, a relevant test case exercises a scenario similar to the scenarios which a user of the code is likely to exercise. Thus, an insufficiently relevant test case may test code for a seldom used function. A redundant test case exercises the same execution path, i.e., the same sequence of statements, as another test case. This application incorporates a unique combination of test factoring, whitebox fuzzing, and dynamic symbolic execution to overcome the drawbacks of existing tools.

As described in this application, an execution trace acts as a starting point to generate and execute relevant, non-redundant test cases. This execution trace may be acquired in several ways, including, in one example, recording details about a typical program execution and the data involved in that program execution. The program execution may be the result of a user manually testing the system, or may be from an existing (albeit possibly small or "starter") test suite. This existing test suite may be manually generated, or generated by testing software.

A sequence of actions, and the data associated with those actions, is extracted from the execution trace. Code is generated for a non-deterministic program ("NDP") that includes the observed sequence of actions, but without determining the data. Observed data is persisted (or stored) for later use. This observed data may be of simple types, e.g., integers, or, in some implementations, complex data types such as sets, maps, or graph structures, as long as the data can be persisted into a machine readable format, and reconstructed later.

A systematic program analysis ("SPA") of the non-deterministic program, including an analysis of the actions the NDP invokes, may be made. The SPA explores possible execution paths, starting with the path exercised by the previously observed data which was persisted. This exploration of execution paths demonstrates the "whitebox" attribute of this process. That is, the testing software described herein is aware of the code that it is testing, rather than simply blindly testing as is the case with "blackbox" testing. For each execution path, a new test case may be generated which fixes particular test inputs for the NDP. The process may then be iterated, to provide more comprehensive testing of execution paths.

Environment

Figure 1:
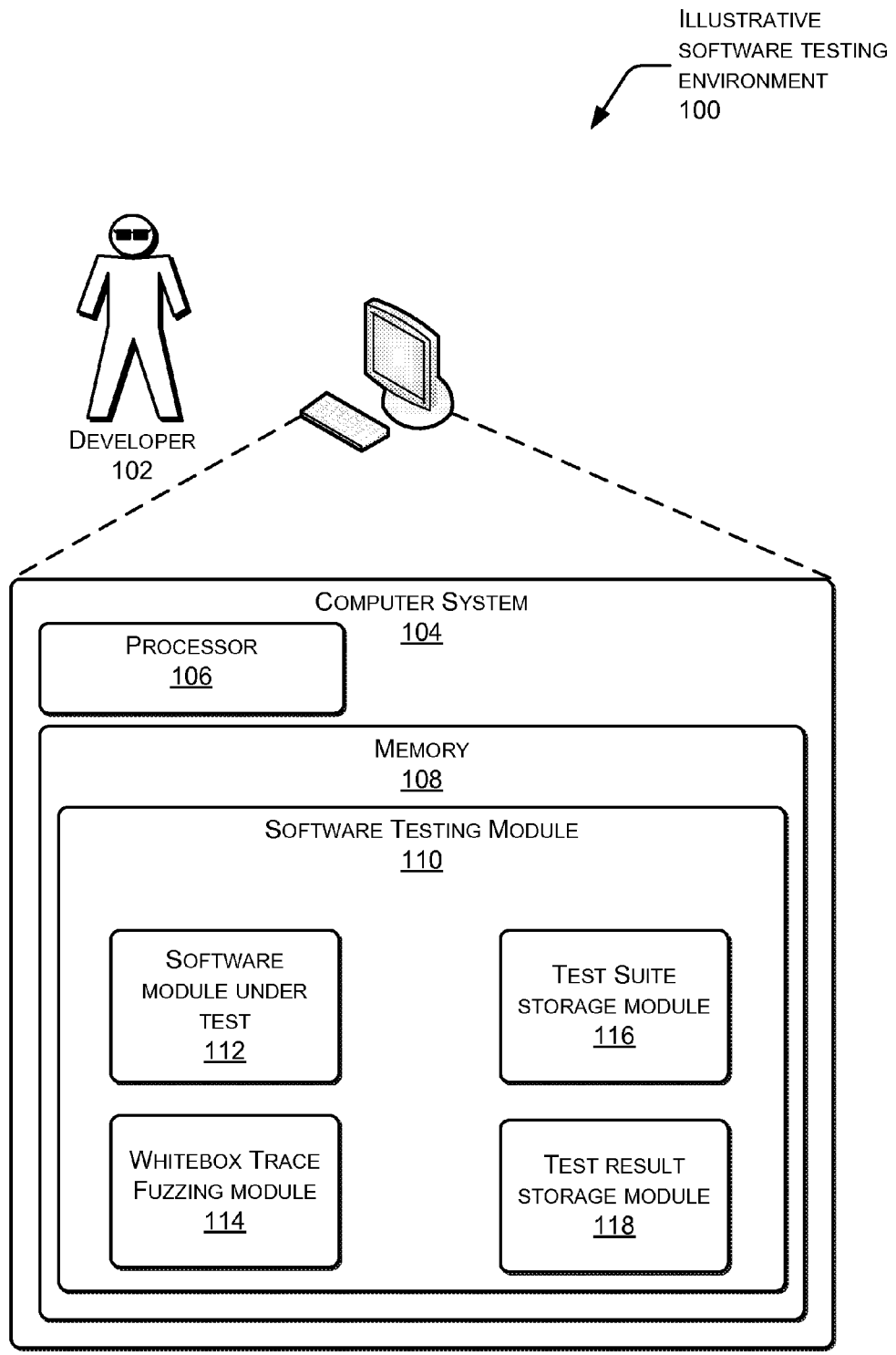
FIG. 1 is schematic of an illustrative software testing environment.

FIG. 1 is schematic of an illustrative software testing environment 100. A software developer 102 is depicted using a development computer system 104. Computer system 104 includes a processor 106, a memory 108 coupled to the processor, and a software testing module 110 stored in the memory 108 and configured to execute on the processor 106. In other implementations, software testing module 110 and any of its components may be stored and/or executed on one or more remote devices and accessed via a communications interface and network.

Software testing module 110 may include a software module under test 112, a whitebox trace fuzzing module 114, a test suite storage module 116, and a test result storage module 118. The software module under test 112 stores the code for which testing is to take place. Whitebox trace fuzzing module 114 is configured to perform whitebox trace fuzzing, which is described later with respect to FIG. 2. Test suite storage module 116 is configured to provide access to one or more test suites. These test suites may comprise test cases, including initial execution traces. Test result storage module 118 is configured to persist (or store) results from the whitebox trace fuzzing module 114. While discrete modules are shown, it is understood that functionality may be otherwise distributed among various modules.

Whitebox Trace Fuzzing

Figure 2:
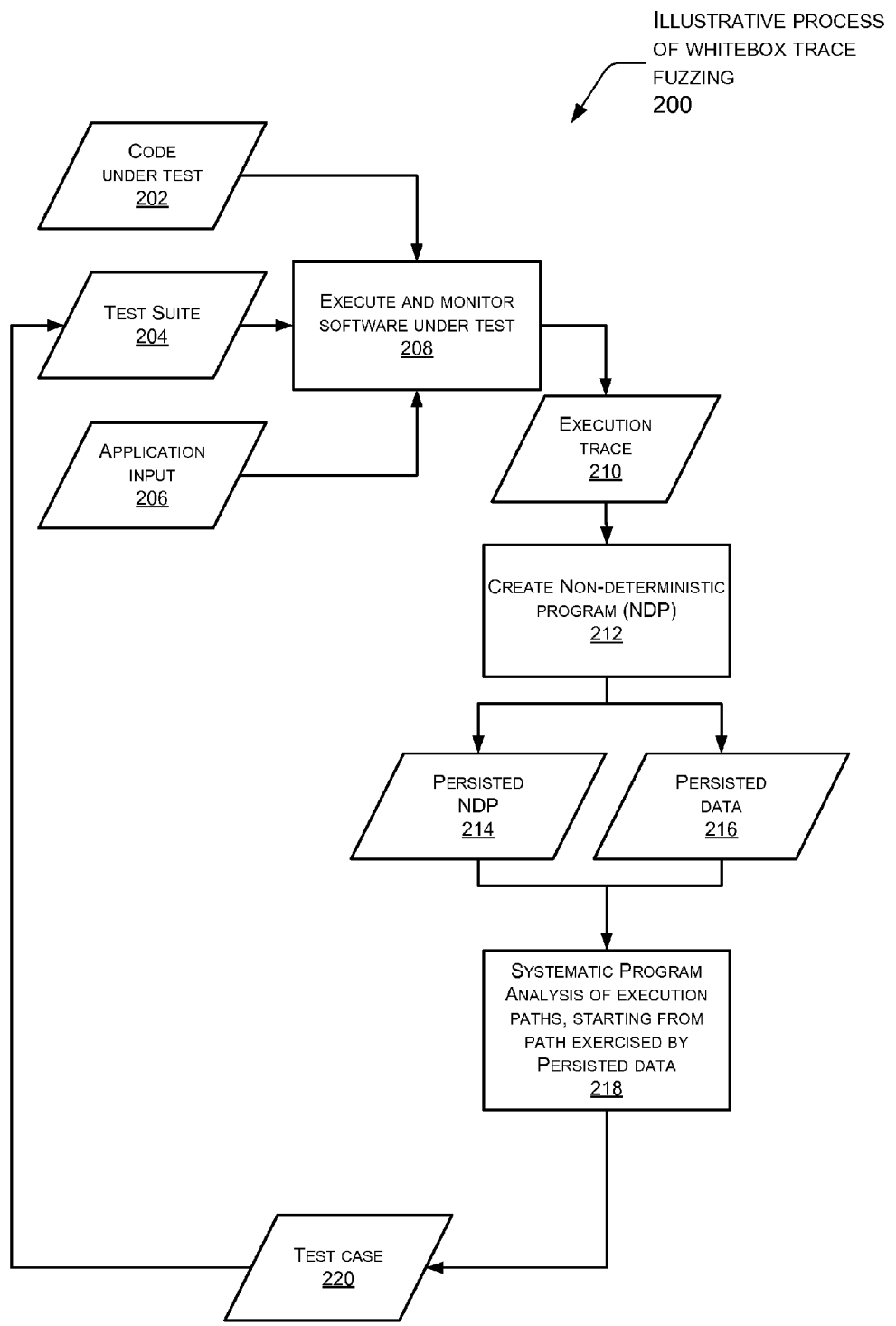
FIG. 2 is a flow diagram of an illustrative process of whitebox trace fuzzing.

FIG. 2 is a flow diagram of an illustrative process 200 of whitebox trace fuzzing that may, but need not, be implemented using the architecture shown in FIG. 1. The process 200 will be described in the context of the architecture of FIG. 1 for convenience and clarity. This illustrative process may be stored in memory 108 and executed on processor 106 of computer system 104, among other implementations.

At 202, code under test is made available for input into the software testing module 110. For the following example, the code under test 202 is a software module "Account," which is part of a banking application. At 204, a test suite, if available in a test suite storage module, for code under test 202 is also made available for input.

At 206, application input is made available. This application input may result from actions of a human tester. In this example, that may include a tester inserting a test bank card into a test ATM, inputting a test personal identification number ("PIN"), and performing three transactions to deduct $100, $200, and then $100 from the test account. These inputs are processed, at 208, during execution and monitoring of the software under test to record a program execution trace.

At 210, the execution trace is analyzed, and a sequence of actions relating to the code under test 202 (in this case, the "Account" module) is extracted. Data passed to the software module under test, such as the "Account" module is also extracted from the execution trace. In this example, the extracted actions and data would be as follows:

TABLE 1

| Extracted Action | Associated Data |
|---|---|
| InsertCard | TestCard |
| InputPIN | 1234 |

TABLE 1-continued

| Extracted Action | Associated Data |
|---|---|
| Withdraw | 100 |
| Withdraw | 200 |
| Withdraw | 100 |

At 212, a non-deterministic program ("NDP") is generated. In some implementations, this NDP may comprise the sequence of actions observed in the execution trace, with the exception that the NDP does not specify the data to be used. The code under test 202 may then operate on data provided by an oracle. The oracle provides new and varied input for testing. Thus, the data provided by the oracle acts as input for testing the software under test. This oracle may include a human or automated oracle, such as a heuristic oracle.

A subset of actions available in the NDP may be selected for testing. This subset may include actions of a separately identified code under test. For example, in the "Account" module, the subset of withdrawal actions may be selected for specific testing.

At 214, the NDP is persisted (or stored). Using the language C#, the NDP in this example could read as follows:

Sample code 1

```
void TestProgram(object card, int pin, int
money1, int money2, int money2)
{
    Account.InsertCard(card);
    Account.InputPIN(pin);
    Account.Withdraw(money1);
    Account.Withdraw(money2);
    Account.Withdraw(money3);
}
```

At 216, persisted data is also stored. This persisted data may include data determined from the execution trace, as well data provided by the oracle. In this example, this would include the data shown in the "Associated Data" column of Table 1.

At 218, a systematic program analysis ("SPA") of execution paths is undertaken. In some implementations, the systematic analysis of execution paths may use dynamic symbolic execution ("DSE"). With DSE, code under test is executed repeatedly with different inputs while monitoring the execution path taken for each input. A constraint solver determines new test inputs that do not fall into the set of inputs characterized by previously observed path conditions. However, unlike typical DSE, here the code under test is initially executed with the inputs derived from the execution trace, so that inputs determined later by the constraint solver are derived from the initial inputs. This conveys a significant benefit because relevant code is exercised from the first test on, and later tests are derived from the first, and therefore likely similar, yet non-redundant by construction.

In this example, inputs are determined which are similar to the previous data vector of (TestCard, 1234, 100, 200, 100), but such that different program behavior is triggered. This may be accomplished with whitebox testing techniques which analyze the code of the program. For example, consider the following implementation of the Account module:

Sample Code 2

```
class Account {
    //other code not relevant to example...
    decimal balance;
    void Withdraw(int amount) {
        while (amount != 0)
        {
            amount = amount - 20;
            balance = balance - 20;
            Dispense20DollarsNote( );
        }
    }
}
```

By analyzing the code of the Withdraw method in Sample Code 2, an automated constraint solver may determine that Withdraw will behave differently when the amount to withdraw is zero. In order to trigger this behavior, a test case is generated which retains the initial values of the input test vector that are necessary to reach the point where a withdrawal can be made, but then it uses "0" as the amount to withdraw. In other words, an input test vector of (TestCard, 1234, 0, . . . ) may be generated. By inspecting the program text, or the compiled program code, the analysis may discover the checked conditions and determine that the code would behave differently for a value not equal to zero, for example, "1". This may result in an input test vector (TestCard, 1234, 1, . . . ), which in turn causes the Withdraw method to go into an infinite loop, dispensing a potentially unlimited amount of money. Thus, the use of a constraint solver results in test cases which exercise different program behaviors. By applying this technique iteratively, an entire test suite may be obtained automatically.

At 220, one or more test cases resulting from the systematic analysis of execution paths are output, and may be incorporated into test suite 204 for iteration as described next in FIG. 3. Given the above process, the test cases constructed are relevant, non-redundant tests.

Figure 3:
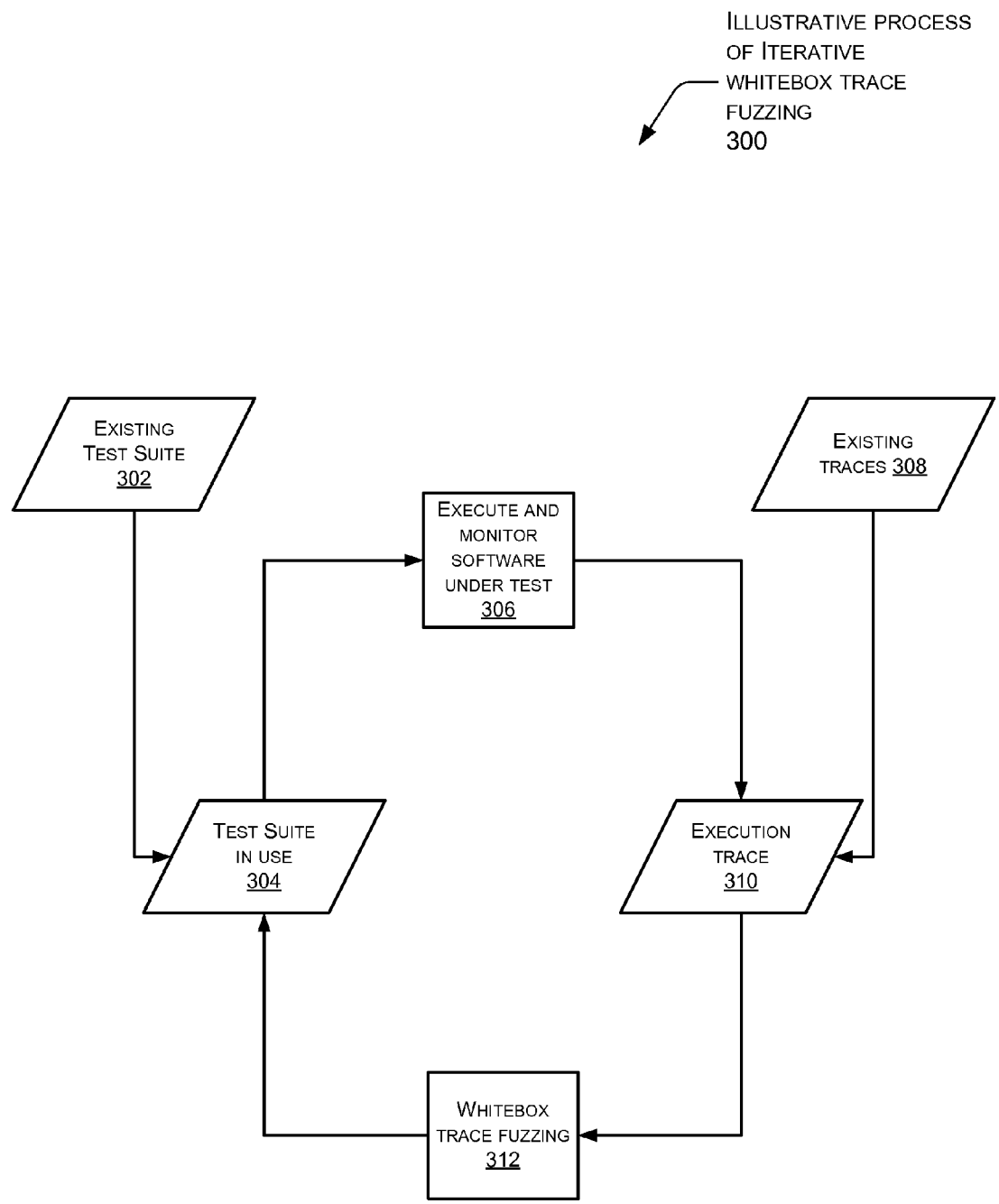
FIG. 3 is a flow diagram of an illustrative process of iterative whitebox trace fuzzing.

FIG. 3 is a flow diagram of an illustrative process 300 of iterative whitebox trace fuzzing. At 302, an existing test suite may be incorporated into a test suite in use at 304. Unlike traditional whitebox fuzzing, which "starts at the beginning" of possible inputs, this incorporation of an existing test as a starting point enables the testing to more quickly reach and explore relevant and meaningful execution paths. As described above, at 306, the software under test is executed and monitored using the test cases from the test suite in use 304. At 308, stored existing traces may be incorporated into execution traces 310 resulting from the execution and monitoring of 306.

At 312, whitebox trace fuzzing as described above with respect to FIG. 2 takes place with the test suite in use 304 and the execution traces 310. Compared to traditional whitebox fuzzing, starting with execution traces results in a significant savings of time, as irrelevant and redundant test cases are not needlessly tested, and the initial input data but not be manually specified, but is derived from the given traces. Even the initial tests result in deep, immediate passes through the code under test. The test suite in use 304 may also incorporate the results from whitebox trace fuzzing 312, and the process may continue.

This iterative process conveys a significant benefit in the context of ongoing testing. Suppose an execution trace is generated for version 1.0 of software under test. As versions 1.1, 1.2, 1.3, etc., are developed, traditional systems would require manual construction or modification of test cases to exercise new functions in these versions. However, using the process described above, the test suite generated from an execution trace of version 1.0, is dynamically and iteratively expanded through the follow-on versions of the software under test, and remains relevant for the later evolving versions. Stated another way, previously obtained test suites may be used to start the exploration of related relevant test cases in the new versions of the program.

In one implementation, testing hooks for the testing functionality may be inserted into bytecode generated from source code. This bytecode may include the Microsoft® Common Intermediate Language ("CIL"), which is also known as Microsoft® Intermediate Language ("MSIL"), the bytecode of Sun Microsystem's Java™, and so forth. Bytecode is generally executed on a virtual machine, which handles the final conversion of the bytecode to machine executable instructions. Placement of the hooks in the bytecode may offer several advantages, including the avoidance of versioning problems, concealing the hooks from end users, and providing for runtime instrumentation.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. One or more computer-readable storage media storing instructions that when executed instruct a processor to perform acts comprising:
    collecting an execution trace resulting from software under test;
    extracting from the execution trace a sequence of actions;
    extracting from the execution trace observed data associated with the actions;
    generating code for a non-deterministic program ("NDP") from the extracted execution trace;
    storing the observed data;
    performing a systematic program analysis of the NDP, starting from a path exercised by the observed data and extending into one or more different execution paths; and
    generating a test case comprising a set of inputs for each execution path.

2. The computer-readable storage media of claim of claim 1, wherein the generated test case fixes particular test inputs for the NDP.

3. The computer-readable storage media of claim of claim 1, wherein the software under test differs from a software from which an execution trace was acquired.

4. A method of software testing, the method comprising:
extracting from an execution trace of software an action sequence and data associated with the action sequence; and
generating code for a non-deterministic program ("NDP") from the action sequence.

5. The method of claim 4, wherein the NDP comprises one or more different possible execution paths, and a specific execution path is not specified.

6. The method of claim 4, wherein the data may comprise object graphs relating to the action sequence.

7. The method of claim 4, further comprising persisting the actions and data.

8. The method of claim 7, further comprising performing a systematic program analysis of the NDP and actions invoked by exploring possible execution paths, starting with an execution path exercised by the persisted data.

9. The method of claim 8, further comprising generating a test case for each new execution path.

10. The method of claim 9, further comprising iterating the extracting of action sequence and data, generating the NDP, performing the systematic program analysis, and generating a test case for each new execution path until a pre-determined portion of execution paths in the software under test has been exercised.

11. The method of claim 8, further comprising generating a test suite in which each test case invokes the NDP with test inputs selected to execute data paths different from an initial test case.

12. A system comprising:
a processor;
a memory coupled to the processor, the memory storing instructions, that when executed instruct the processor to perform the following acts:
extract a sequence of actions and data associated with the sequence of actions from an execution trace;
generate from the sequence of actions code for a non-deterministic program ("NDP"); and
persist the actions and extracted data.

13. The system of claim 12, wherein testing hooks for the acts are inserted between bytecode and machine compiled code.

14. The system of claim 13, wherein the bytecode is executable on a virtual machine.

15. The system of claim 12, wherein the extracted data comprises an object graph.

16. The system of claim 12, wherein the execution trace is generated by executing software under test.

17. The system of claim 16, wherein the software under test differs from software which generated the execution trace.

18. The system of claim 12, further comprising performing a systematic program analysis of the NDP, starting from a path of program execution exercised by the extracted data.

19. The system of claim 18, further comprising generating a test case for each path of execution and persisting the test case.

20. The system of claim 18, further comprising generating a test suite in which each test case invokes the NDP with test inputs selected to execute paths of execution different from an initial test case.

* * * * *